United States Patent
Goade, Sr. et al.

(10) Patent No.: US 7,188,762 B2
(45) Date of Patent: Mar. 13, 2007

(54) SECURE CARD PACKAGE FOR TRANSACTION CARDS AND METHOD OF ACTIVATING THE SAME

(75) Inventors: Ron E. Goade, Sr., Scottsdale, AZ (US); Sean C. Goade, Oklahoma City, OK (US)

(73) Assignee: Advanced Card Technologies LLC, Suffern, NY (US)

( * ) Notice: Subject to any disclaimer, the term of this patent is extended or adjusted under 35 U.S.C. 154(b) by 0 days.

(21) Appl. No.: 10/886,106

(22) Filed: Jul. 7, 2004

(65) Prior Publication Data

US 2006/0006225 A1    Jan. 12, 2006

Related U.S. Application Data

(60) Provisional application No. 60/569,286, filed on May 7, 2004.

(51) Int. Cl.
*G06K 5/00* (2006.01)
*G06K 7/00* (2006.01)
*G06K 19/06* (2006.01)
*G06Q 40/00* (2006.01)
*G07D 11/00* (2006.01)
*G07F 19/00* (2006.01)

(52) U.S. Cl. ............... 235/380; 235/486; 235/493; 235/379; 235/487

(58) Field of Classification Search ............ 235/381, 235/380, 382, 375, 379, 493, 497, 486; 428/43; 229/71
See application file for complete search history.

(56) References Cited

U.S. PATENT DOCUMENTS

| | | | |
|---|---|---|---|
| 2,616,612 A | 11/1952 | Guttman | |
| 3,583,317 A | 6/1971 | Gibson | |
| 4,204,639 A | 5/1980 | Barber et al. | |
| 4,957,311 A | 9/1990 | Geisenheimer | |
| 4,978,146 A | 12/1990 | Warther et al. | |
| 5,076,490 A | 12/1991 | Dulin | |
| 5,299,835 A | 4/1994 | Sonnenberg | |
| 5,495,981 A | 3/1996 | Warther | |

(Continued)

FOREIGN PATENT DOCUMENTS

GB      2281714      3/1995

OTHER PUBLICATIONS

Passenger Service Conference Resolutions Manual, 11th Edition, pp. 157-164, Jan. 1991.

(Continued)

*Primary Examiner*—Michael G. Lee
*Assistant Examiner*—Thien T. Mai
(74) *Attorney, Agent, or Firm*—Paul I. Lerner

(57) ABSTRACT

A secure card package which includes an inactive transaction card that includes an edge. The secure card package also includes a security piece that includes an edge. The security piece and the inactive transaction card are connected in an edge-to-edge manner to prevent the transaction card from being activated. The security piece is selectively detachable from the transaction card so that, when detached, the transaction card can be activated. The invention also includes a process for activating an inactive transaction card which includes the steps of receiving the inactive transaction card and a security piece and detaching the security piece from the inactive transaction card so that the inactive transaction card can be activated.

43 Claims, 7 Drawing Sheets

U.S. PATENT DOCUMENTS

| | | | |
|---|---|---|---|
| 5,522,956 A * | 6/1996 | McCannel | 156/209 |
| 5,609,253 A | 3/1997 | Goade, Sr. | |
| 5,650,209 A | 7/1997 | Ramsburg et al. | |
| 5,720,158 A | 2/1998 | Goade, Sr. | |
| 5,740,915 A | 4/1998 | Williams | |
| 5,760,381 A * | 6/1998 | Stich et al. | 235/380 |
| 5,769,457 A | 6/1998 | Warther | |
| 5,770,283 A * | 6/1998 | Gosselin et al. | 428/35.7 |
| 5,842,629 A * | 12/1998 | Sprague et al. | 229/71 |
| 5,918,909 A * | 7/1999 | Fiala et al. | 283/61 |
| 5,921,584 A | 7/1999 | Goade, Sr. | |
| 6,109,439 A | 8/2000 | Goade, Sr. | |
| 6,270,012 B1 | 8/2001 | Dawson | |
| 6,315,206 B1 * | 11/2001 | Hansen et al. | 235/487 |
| 6,454,165 B1 | 9/2002 | Dawson | |
| 6,588,658 B1 * | 7/2003 | Blank | 235/380 |
| 6,778,066 B2 * | 8/2004 | Smith | 340/5.61 |
| 6,814,375 B2 | 11/2004 | Cox et al. | |
| 6,832,720 B2 * | 12/2004 | Dawson | 235/381 |
| 7,000,844 B1 | 2/2006 | Smith | |
| 2003/0066777 A1 * | 4/2003 | Malone | 206/449 |
| 2003/0150919 A1 * | 8/2003 | Blank | 235/487 |
| 2004/0026915 A1 * | 2/2004 | Thompson et al. | 283/51 |
| 2004/0182940 A1 * | 9/2004 | Biller | 235/493 |
| 2005/0242193 A1 * | 11/2005 | Smith et al. | 235/487 |
| 2005/0247798 A1 * | 11/2005 | Graves et al. | 235/493 |

OTHER PUBLICATIONS

PCT International Preliminary Report on Patentability, Written Opinion of the International Searching Authority, PCT/US2005/014479, Nov. 16, 2006.

* cited by examiner

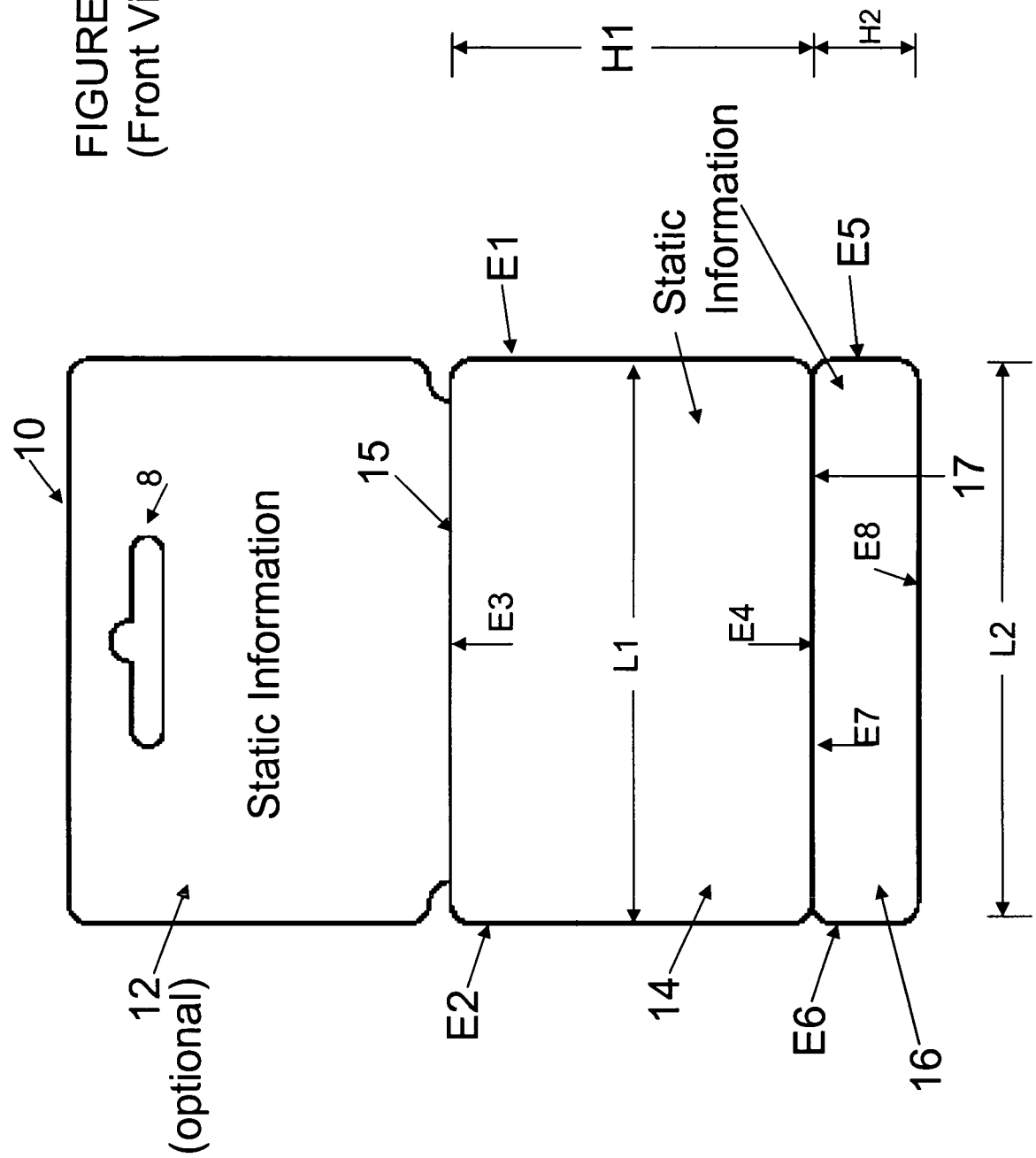

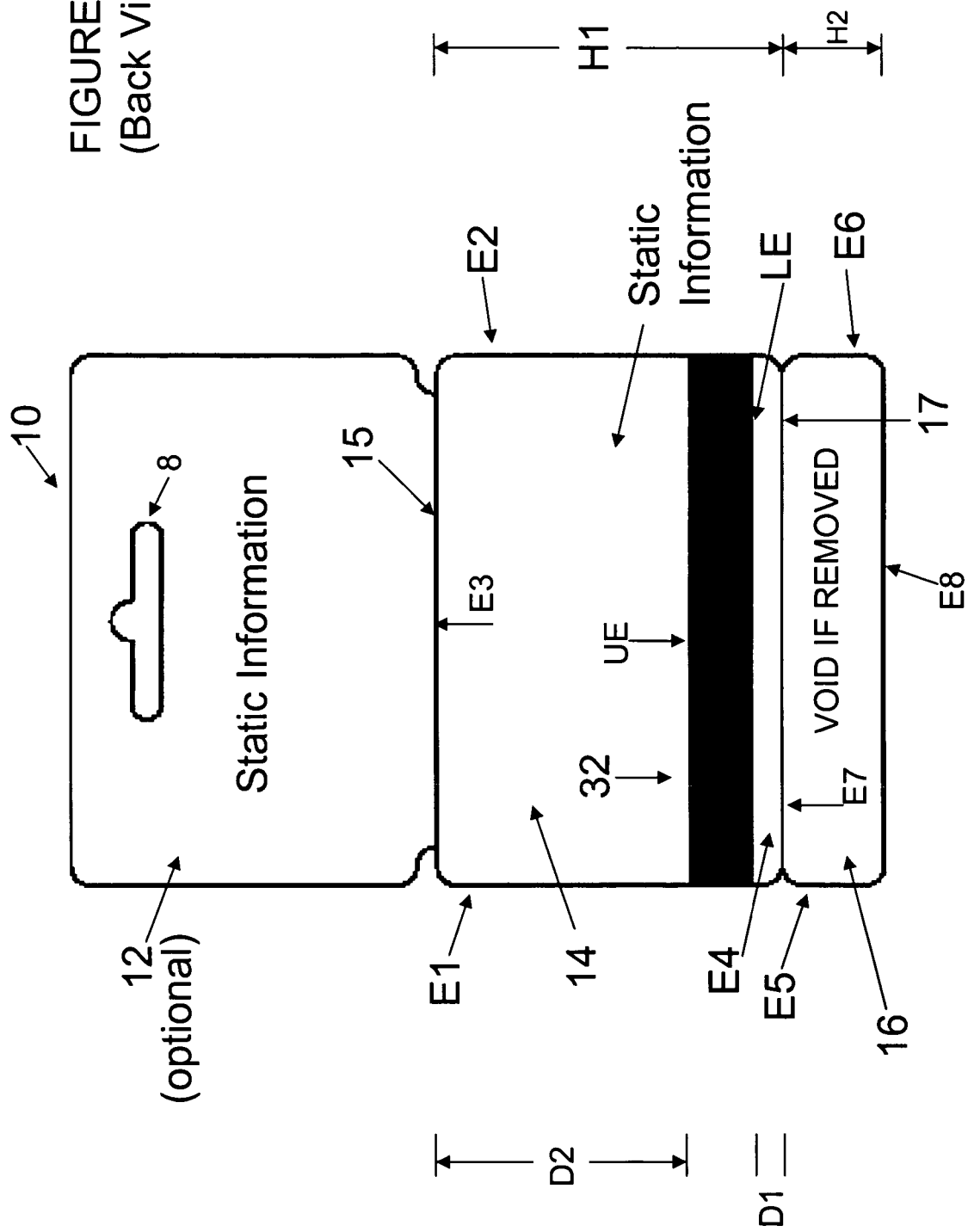

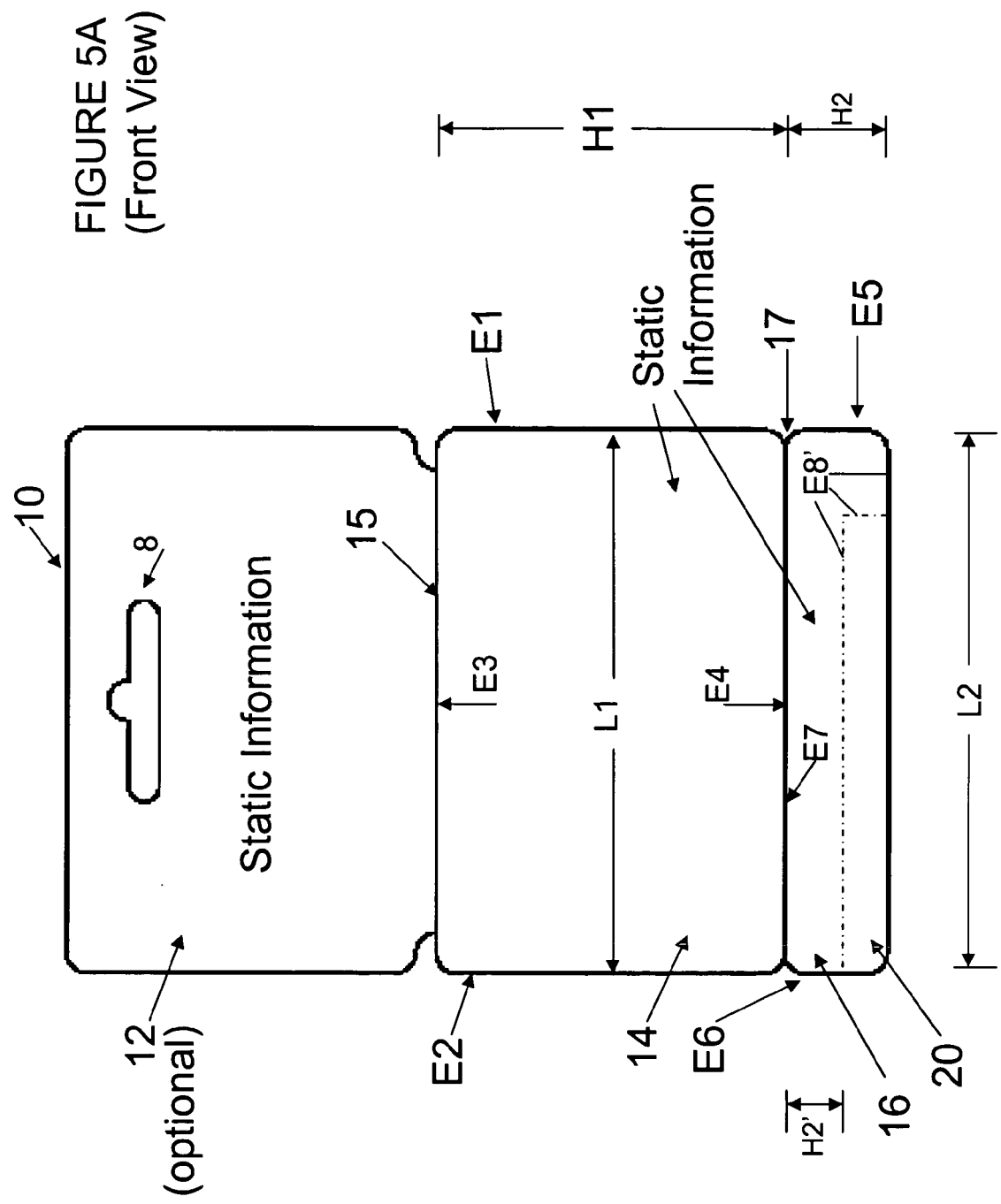

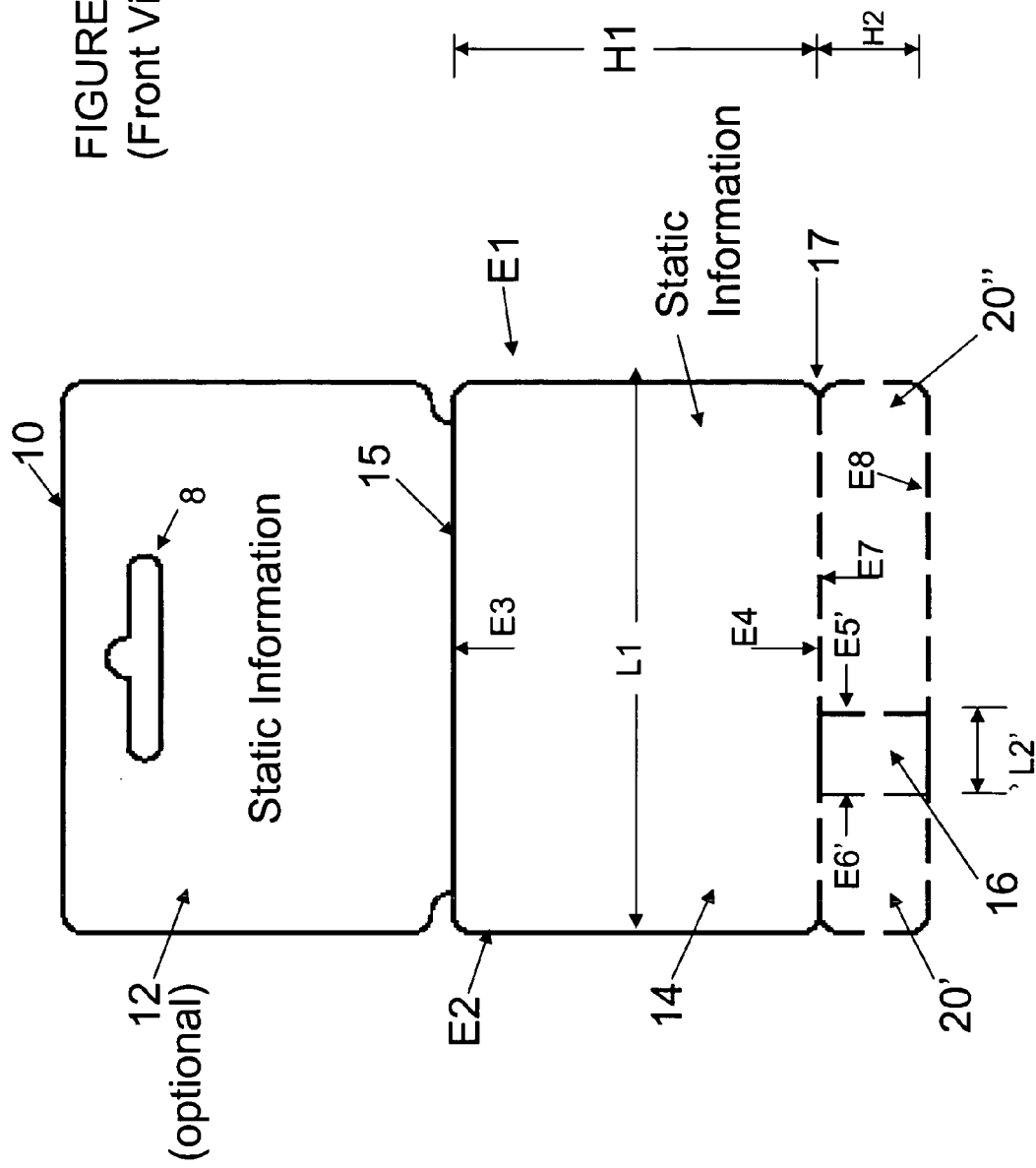

SECURE CARD PACKAGE FOR TRANSACTION CARDS AND METHOD OF ACTIVATING THE SAME

CROSS REFERENCE TO RELATED APPLICATION

This application claims the benefit of provisional application Ser. No. 60/569,286 filed May 7, 2004.

STATEMENT REGARDING FEDERALLY SPONSORED RESEARCH AND DEVELOPMENT

Not applicable.

BACKGROUND

The present disclosure relates generally to transaction cards, and more particularly, to a secure package for transaction cards and to a method of activating the same. The secure card package and method of activating the same may be used to solve the problem of "skimming" of transaction cards.

One type of transaction card is commonly known as a "gift card." A gift card typically is the size and shape of a conventional credit card and includes a magnetic stripe. The magnetic stripe is encoded with data, which includes a unique account number.

The gift card has a monetary value associated with it, which is stored in a database record corresponding to the gift card. A holder of the gift card can use it to purchase goods and/or services, immediately or over time, up to the monetary value of the gift card. As the holder uses the gift card or adds additional value to it, the associated monetary value is updated in the database record.

It has become common for retailers to display gift cards in their store for purchase by customers. The gift cards typically displayed at this point of sale are inactive so that they cannot be used to purchase goods and/or services. This prevents use of a gift card for which the retailer has not received payment.

To activate the gift card so that it can be used for purchases, a customer brings the gift card to a cashier in the store and pays for it. The cashier swipes the gift card through a point of sale (POS) terminal, which includes a card reader. The card reader reads the data stored on the magnetic stripe (e.g., the account number). The POS terminal communicates the data to a host, which updates the database record corresponding to the gift card to indicate that it is active. The monetary value stored in the database record and associated with the gift card may then be used.

The act of producing an unauthorized copy of a gift card from an original gift card—commonly known as "skimming"—is a serious problem for retailers. Skimming results in millions of dollars of lost value stored on gift cards, if not more.

To skim a gift card, an unscrupulous person removes two inactive gift cards, for example, from a retail location or warehouse. Using a relatively inexpensive and readily available card reader and encoder ("reader/encoder"), the unscrupulous person copies the data from the magnetic stripe of one inactive gift card to the other. The two gift cards thus include the same data encoded on the magnetic stripe and may be identical in all other respects.

One of the gift cards is then returned to the appropriate location, such as the place in the retail store from which it was removed. The unscrupulous person may mark the original gift card in some fashion so that he/she will know when it has been activated.

An unsuspecting customer later purchases the gift card in the conventional manner and it is activated as described above. Thus, the inactive gift card becomes active, with the monetary value associated therewith able to be used at the present time, or most likely, at a time in the future.

The unscrupulous person, having the unauthorized copy of the now active gift card, purchases goods and/or services thereby depleting much, if not all, of the value associated with the gift card. When the unsuspecting customer attempts to use the gift card, he/she will be told it has no associated value or has a smaller value than thought.

In most cases, the retailer is able to verify that the customer did not use the value associated with the gift card and, in the interest of customer service, restores the value to the customer. In some cases, however, the customer loses the entire value because he/she does not have a receipt for the original purchase. Thus, both retailers and customers suffer significant monetary loss from the skimming of gift cards.

The present disclosure, and the claims that legally define the invention hereof, provide a novel and unobvious solution to eliminate skimming.

SUMMARY OF THE DISCLOSURE

A first aspect of the present disclosure relates to a secure card package, which includes an inactive transaction card. It also includes a security piece integrally formed with the inactive transaction card to prevent the inactive transaction card from being activated, wherein the security piece is selectively detachable from the inactive transaction card so that, when detached, the inactive transaction card can be activated.

A second aspect of the present disclosure relates to a process for activating the inactive transaction card described in the first aspect of the disclosure. The process includes the steps of receiving the inactive transaction card and the security piece and detaching the security piece from the inactive transaction card so that the inactive transaction card can be activated.

A third aspect of the present disclosure relates to a secure card package, which includes an inactive transaction card. The inactive transaction card includes a magnetic stripe thereon and wherein the magnetic stripe includes data thereon. The secure card package also includes a security piece connected to the inactive transaction card to prevent the data on the magnetic stripe from being read by a card reader located in a retail establishment. The security piece is selectively detachable from the inactive transaction card so that, when detached, the inactive transaction card can be read by the card reader located in the retail establishment.

A fourth aspect of the present disclosure relates to a process for activating the inactive transaction card described in the third aspect of the disclosure. The process includes the steps of receiving the inactive transaction card and the security piece and detaching the security piece from the inactive transaction card so that the inactive transaction card can be activated.

A fifth aspect of the present disclosure relates to a secure card package, which includes an inactive transaction card that includes an edge. The secure card package also includes a security piece including an edge. The security piece and the inactive transaction card are connected in an edge-to-edge manner to prevent the transaction card from being activated. The security piece is selectively detachable from the transaction card so that, when detached, the transaction card can be activated.

A sixth aspect of the present disclosure relates to a process for activating the inactive transaction card described in the fifth aspect of the disclosure. The process includes the steps of receiving the inactive transaction card and the security piece and detaching the security piece from the inactive transaction card so that the inactive transaction card can be activated.

A seventh aspect of the present disclosure relates to a process for activating an inactive transaction card. The process includes the step of receiving the inactive transaction card and a security piece integrally formed with and selectively detachable from the inactive transaction card. The security piece prevents the inactive transaction card from being activated. The process also includes the step of detaching the security piece from the inactive transaction card so that the inactive transaction card can be activated.

An eighth aspect of the present disclosure relates to a process for activating an inactive transaction card using a card reader. The inactive transaction card includes a magnetic stripe thereon and the magnetic stripe includes data thereon. The card reader is configured to read the data from the magnetic stripe of the inactive transaction card. The process includes the step of receiving the inactive transaction card and a security piece connected to and selectively detachable from the inactive transaction card. The data on the magnetic stripe cannot be read by the card reader when the security piece is connected to the transaction card and the data on the magnetic stripe can be read by the card reader when the security piece is detached from the transaction card. The process also includes the step of detaching the security piece from the inactive transaction card so that the card reader can read the data on the magnetic stripe to activate the inactive transaction card.

A ninth aspect of the present disclosure relates to a process for activating an inactive transaction card using a card reader. The inactive transaction card includes a magnetic stripe thereon and the magnetic stripe includes data thereon. The inactive transaction card includes an edge. The card reader is configured to read the data from the magnetic stripe of the inactive transaction card. The process includes the step of receiving the inactive transaction card and a security piece, wherein the security piece includes an edge. The security piece and the transaction card are connected at the edges thereof and the security piece is selectively detachable from the transaction card. The data on the magnetic stripe cannot be read by the card reader when the security piece is connected to the inactive transaction card and the data on the magnetic stripe can be read by the card reader when the security piece is detached from the inactive transaction card. The process also includes the step of detaching the security piece from the inactive transaction card so that the card reader can read the data on the magnetic stripe to activate the inactive transaction card.

A tenth aspect of the present disclosure relates to a secure card package, which includes an inactive transaction card. The inactive transaction card includes a first edge and a second edge. The transaction card includes a magnetic stripe thereon, wherein the magnetic stripe is parallel to the first edge and the second edge. The magnetic stripe is disposed closer to the first edge than to the second edge. The secure card package also includes a security piece connected to the transaction card at the first edge to prevent the transaction card from becoming active. The security piece is selectively detachable from the transaction card at the first edge to enable the transaction card to become active.

An eleventh aspect of the present disclosure relates to a secure card package, which includes a transaction card that is inactive. The transaction card has a value associated therewith, wherein the value cannot be used to purchase goods and/or services while the transaction card is inactive. The secure card package also includes a security piece connected to and selectively detachable from the transaction card. The security piece, when connected to the transaction card, prevents the transaction card from becoming active. The security piece, when detached from the transaction card, enables the transaction card to become active so that the value can be used to purchase goods and/or services.

BRIEF DESCRIPTION OF THE DRAWINGS

FIGS. 1A and 1B are front and back views, respectively, of a secure card package constructed in accordance with one embodiment of the present disclosure.

FIGS. 5A and 5B are front views, respectively, of alternate embodiments of a secure card package constructed in accordance with the present disclosure.

DETAILED DESCRIPTION OF THE DISCLOSURE

Figure 2:
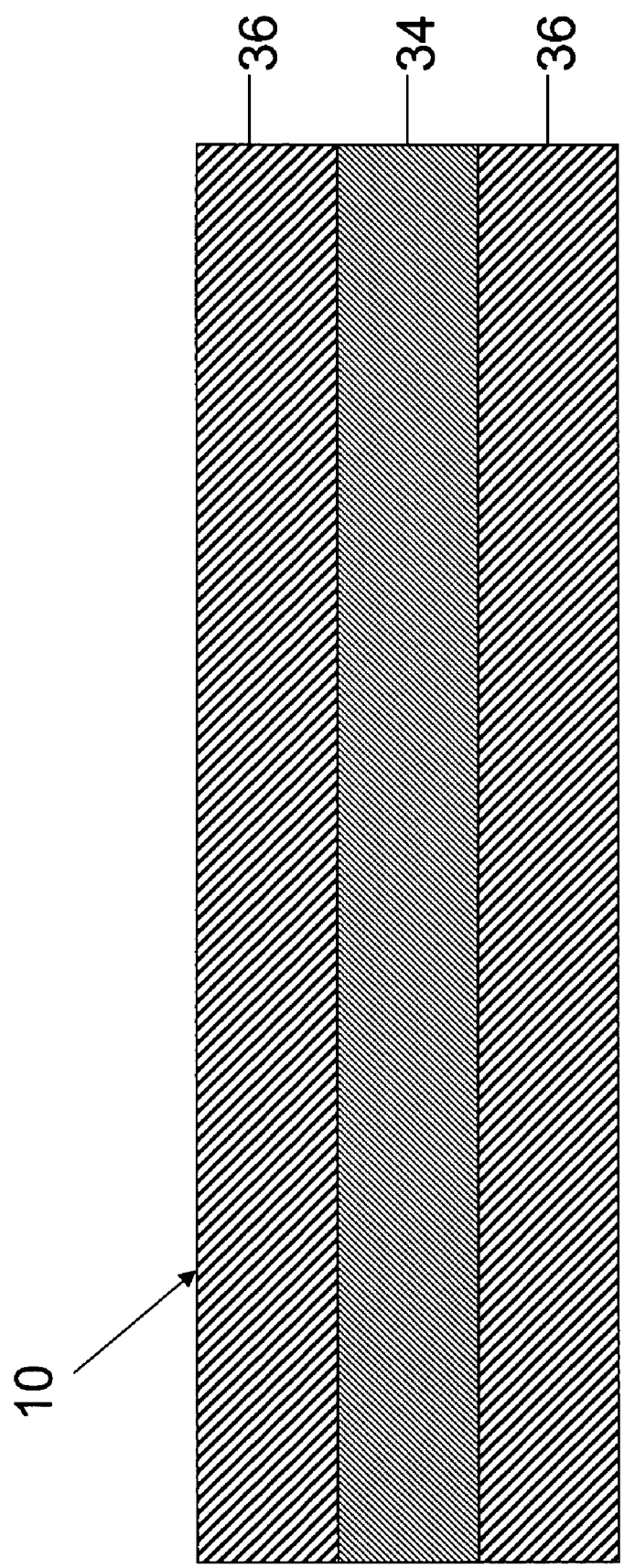
FIG. 2 is a fragmented cross sectional view of the secure card package of FIG. 1.

The following describes a secure card package for inactive transaction cards, which store data thereon in a predetermined location. In the embodiments described below, the secure card package is described with reference to a transaction card that stores data on a magnetic stripe. However, the secure card package may also be used with contact-based smart cards (e.g., contact, hybrid, and dual interface cards) or other transaction cards that require relatively precise positioning of the card such that the data thereon can be read.

Referring now to the drawings, FIGS. 1A and 1B show, respectively, the front and back sides of a secure card package 10 constructed in accordance with one embodiment of the present disclosure. The secure card package 10 includes an inactive transaction card 14, a security piece 16, and an optional card carrier 12.

In the exemplary embodiment shown, the inactive transaction card 14 includes four edges E1, E2, E3, and E4. Edge E1 is substantially parallel to edge E2 and edge E3 is substantially parallel to edge E4. The transaction card 14 also includes a magnetic stripe 32 that extends at least substantially from edge E1 to edge E2. The magnetic stripe 32 includes a lower edge LE and an upper edge UE.

The magnetic stripe 32 has data encoded thereon, which generally varies with the type of transaction card. For example, if the transaction card is a gift card, the data encoded on the magnetic stripe usually includes an account number and an indication of the transaction provider for the gift card (e.g., First Data Corp., Stored Value Systems, etc.). As another example, if the transaction card is a credit card, the data typically includes an account number, name of the card holder, and an expiration date.

In this embodiment, the magnetic stripe 32 is disposed closer to the edge E4 than it is to the edge E3. Thus, there is a first distance D1 between the lower edge LE of the magnetic stripe 32 and the edge E4 of the inactive transaction card 14 that is less than a second distance D2 between the upper edge UE of the magnetic stripe 32 and the edge E3 of the inactive transaction card 14.

In this example, the inactive transaction card 14 is configured in accordance with at least certain aspects of ISO and/or ANSI standards for transaction cards. Thus, the inactive transaction card 14 has a length L1 equal to 3.375" and a height H1 equal to 2.125". The magnetic stripe 32 is positioned so that its lower edge is spaced 0.223" from the edge E4 of the inactive transaction card. The magnetic stripe 32 is positioned so that its upper edge UE is spaced at either 0.443" or 0.553" from the edge E4 of the inactive transaction card 14, depending, respectively, on whether the magnetic stripe 32 includes two tracks or three tracks.

The illustrative embodiment of FIGS. 1A and 1B shows that the security piece 16 is connected to and selectively detachable from the transaction card 14 at a line of weakness 17.

In the example shown, the security piece 16 includes four edges E5, E6, E7, and E8. Edge E5 is substantially parallel to edge E6 and edge E7 is substantially parallel to edge E8. The line of weakness 17 may be formed by scoring, perforating, die cutting, or any other manner as is well known in the art. In this embodiment, the security piece 16 is free from contact with the magnetic stripe 32.

In the described embodiment, the security piece 16 has a length L2 that is equal to the length L1 of the transaction card 14 and a height H2 that is equal to 0.5". The precise shape and dimensions of the security piece 16 are not important as long as they prevent predetermined reader/encoder equipment from reading the data on the magnetic stripe 32 of the inactive transaction card 14.

From FIGS. 1A and 1B, it is thus seen that when the security piece 16 is connected to the inactive transaction card 14, the lower edge LE of the magnetic stripe 32 is positioned 0.723" from the edge E8 of the security piece 16. In the case of readily available and inexpensive readers/encoders configured to read ISO- and/or ANSI-compliant transaction cards, this distance positions the magnetic stripe 32 outside of the range in which the data on the magnetic stripe 32 can be read, even when such equipment can read magnetic stripes that vary in position by plus or minus 5%. As such, this prevents copying, and thus skimming, of the inactive transaction card 14.

When the security piece 16 is detached from the transaction card 14, preferably by a cashier at a point of sale thereof, the lower edge LE of the magnetic stripe 32 is positioned 0.223" from the edge E4 of the transaction card 14. As such, the data on the magnetic stripe 32 can be read by ISO- and/or ANSI-compliant card readers (e.g., in POS terminals) to activate the inactive transaction card 14.

In a preferred embodiment, a card carrier 12 may be part of the secure card package 10. In this case, the inactive transaction card 14 is connected to and selectively detachable from the card carrier 12 at a line of weakness 15, which may be formed in a manner similar to the line of weakness 17. In this example, the card carrier 12 is free from contact with the security piece 16. The card carrier 12 may include an aperture 8 that enables the card package 10 to be displayed from a display peg, hook, or similar device.

In a preferred embodiment, the transaction card 14, the security piece 16, and when used, the card carrier 12, are formed from a single sheet of material. In this way, the inactive transaction card 14 is integrally formed with and selectively detachable from the security piece 16 and the card carrier 12.

The front and/or back of the card carrier 12, transaction card 14, and the security piece 16 may be used to display non-variable and/or variable information—for example, graphics, instructional information explaining how to use the transaction card 14, promotional information related to the establishment distributing the transaction card 14, bar codes, pin numbers (covered with a scratch off material), or the like. In a preferred embodiment, the back side of security piece 16 includes text such as "VOID IF REMOVED" to indicate that that inactive transaction card 14 will not be activated if the security piece 16 is detached therefrom by a person other than the person who is authorized to activate the inactive transaction card 14 (e.g., a cashier).

The type of the transaction card 14 is not important. Thus, it may be a gift card, loyalty card, credit or debit card, health card, phone card, pre-paid phone card, membership card, identification card, ringtone card, or any other type of card.

FIG. 2 shows the secure card package 10 as being constructed of a sheet of material 34, which optionally may be laminated on one or more sides thereof with a transparent plastic material or liquid 36. The sheet of material 34 is made of a material capable of receiving printed matter and preferably is a plastic material such as PVC, PET, PETG, or ABS. The sheet of material 34 may also be a paper or synthetic paper, such as a TESLIN sheet. The plastic material or liquid 36 provides the sheet of material 34 with a protective cover to increase the life of the secure card package 10 and provides the secure card package 10 with a certain degree of rigidity which facilitates the handling thereof. The plastic material or liquid 36 is bonded or applied to the sheet of material 34 in a conventional manner as is well known in the art.

Figure 3:
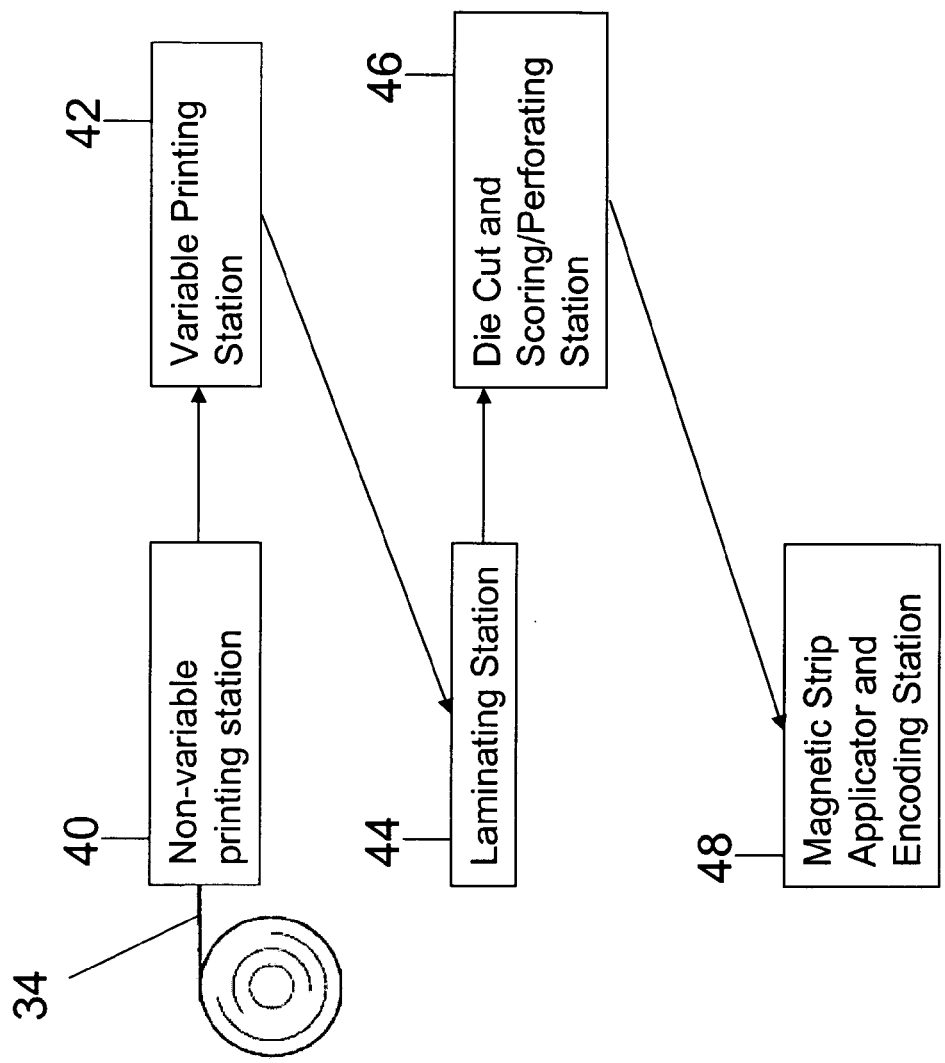
FIG. 3 is a block diagram of a method of making the secure card package of FIG. 1.

Referring now to FIG. 3, the secure card package 10 is formed by first passing the sheet of material 34 through a non-variable printing station 40, where the non-variable information of the secure card package 10 is disposed on the inactive transaction card 14, the security piece 16, and/or the card carrier 12 (when used). The non-variable information can be disposed on one or both sides of the sheet of material 34. The sheet of material 34 is passed through a variable printing station 42, where pin numbers, bar codes, and/or other variable information may be disposed on the sheet of material 34. In the case where the sheet of material 34 is laminated with the plastic material or liquid 36, it is passed through a laminating station 44, where one or both sides of the sheet of material 34 are laminated with the plastic material or liquid 36 in a conventional manner.

The laminated sheet of material 34 is then passed through a die cutting and/or scoring/perforating station 46 where the laminated sheet of material 34 is cut to the desired size. The lines of weakness 17 and 15 (when used) are formed in the laminated sheet of material 34 so as to define the carrier 12 (when used), the transaction card 14, and the security piece 16. In a preferred embodiment, the lines of weakness 15 and 17 are formed in the sheet of material 34 such that the transaction card 14 remains integrally formed with the card carrier 12 while being selectively detachable therefrom and the security piece 16 remains integrally formed with the transaction card 14 while being selectively detachable therefrom.

With the secure card package 10 sized and shaped, it is passed through a magnetic stripe applicator and encoder station 48 to apply and encode the magnetic stripe 32. The station 48 may also print a bar code or other variable information 33 that serves to verify that the data encoded on the magnetic stripe 32 is correct.

As described above, when the security piece 16 is connected to the transaction card 14, the unscrupulous copyist cannot cause the magnetic stripe 32 to be read by predetermined readers/encoders—for example, those that are ISO- and/or ANSI-compliant. Similarly, when the security piece 16 and the transaction card 14 are connected, card manufacturers cannot use ISO- and/or ANSI-compliant magnetic stripe encoders to encode the magnetic stripe 32.

Thus, to encode the secure card package 10, an existing encoding device may be modified or a new machine may be built that encodes an inactive transaction card 14 with the security piece 16 connected thereto. One skilled in the art will readily be able to configure the write and read heads, and other supporting and related structures, into desired positions, which will depend on the dimensions of the security piece 16. In this way, the magnetic stripe 32 can be encoded even when the inactive transaction card 14 is connected to the security piece 16.

Figure 4:
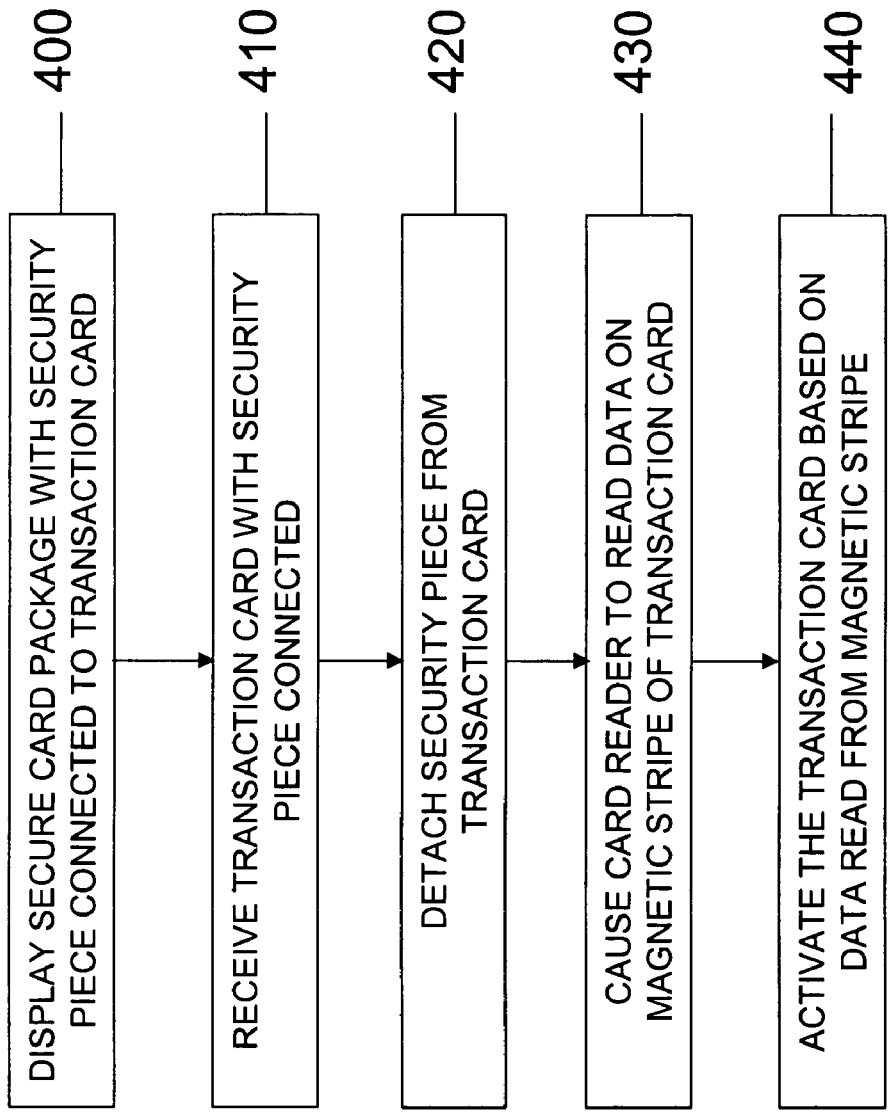
FIG. 4 describes a method for activating an inactive transaction card.

FIG. 4 describes a process for activating an inactive transaction card 14 using a POS terminal, which includes a card reader, located at a point of sale. At step 400, an establishment displays the secure card package 10, including the inactive transaction card 14 and the security piece 16 connected thereto, for viewing and purchase by a customer. When used, the card carrier 12 is displayed with the inactive transaction card 14 and the security piece 16. The customer may remove the secure card package 10 from the display and bring it to a cashier. At this point, the security piece 16 is connected to the inactive transaction card 14 such that the data on the magnetic stripe 32 cannot be read by the card reader.

At step 410, the cashier receives the inactive transaction card 14 and the security piece 16. If the inactive transaction card 14 and the security piece 16 are detached when the cashier receives the same, then the cashier will not activate the inactive transaction card 14. If the transaction card 14 and the security piece 16 are connected when the cashier receives the same, then, at step 420, the cashier detaches the security piece 16 from the transaction card 14. This enables the data on the magnetic stripe 32 to be read by the card reader.

At step 430, the cashier causes the data on the magnetic stripe 32 to be read by the card reader—for example, by swiping the magnetic stripe 32 through the card reader. At step 440, the inactive transaction card 14 is activated in a conventional manner based on the data read from the magnetic stripe 32.

In alternate embodiments of the secure card package 10, the shape of the security piece 16 may be modified to provide increased measures of security. For example, as shown in FIG. 5A, a section 20 of the security piece 16 may be removed (e.g., by die cutting) after the magnetic stripe 32 (on reverse side) is encoded. In this manner, the security piece 16 has two heights H2 and H2' and does not have a straight edge E8'. This makes it much more difficult (if not impossible) for an unscrupulous person to swipe the inactive transaction card 14 and connected security piece 16 in a manner that permits the data on the magnetic stripe 32 to be read.

In the embodiment of FIG. 5B, two sections 20' and 20" may be removed so that the length L2' of the security piece 16 (here, resembling a tab) is less than the length L1 of the inactive transaction card 14. In this case, the vertical edges E5' and E6' may be perpendicular to and are under the edge E4 of the inactive transaction card 14.

While presently preferred embodiments of the disclosure have been described for purposes of this disclosure, it will be understood that numerous changes may be made which will readily suggest themselves to those skilled in the art and which are accomplished within the spirit of the disclosure disclosed and as defined in the appended claims.

We claim:

1. A secure card package, comprising:
    (a) an inactive transaction card;
    (b) a security piece formed from the same piece of material as the inactive transaction card to prevent the inactive transaction card from being activated, wherein the security piece is selectively detachable from the inactive transaction card, wherein detachment of the security piece enables activation of the inactive transaction card, and wherein the security piece does not include means for activating the inactive transaction card; and
    (c) a card carrier formed from the same piece of material as the inactive transaction card, wherein the card carrier is selectively detachable from the inactive transaction card.

2. The secure card package of claim 1, wherein the card carrier is free from contact with the security piece.

3. The secure card package of claim 1, wherein the card carrier includes an aperture therein for displaying the secure card package from a display device.

4. The secure card package of claim 1, wherein the transaction card includes a magnetic stripe thereon, and wherein magnetic stripe includes data thereon.

5. The secure card package of claim 4, wherein the magnetic stripe is disposed on the inactive transaction card in accordance with ISO and/or ANSI standards.

6. The secure card package of claim 1, wherein the security piece includes information indicating that the transaction card will not be activated if the security piece is detached therefrom.

7. The secure card package of claim 1, wherein the security piece does not include machine readable data.

8. The secure card package of claim 1, wherein the transaction card has a type associated therewith, and wherein the type is selected from the group consisting of a gift card, loyalty card, credit card, debit card, health card, phone card, pre-paid phone card, membership card, identification card, or ringtone card.

9. The secure card package of claim 1, wherein the inactive transaction card has a length associated therewith, wherein the security piece has a length associated therewith, and wherein the length of the security piece is less than the length of the inactive transaction card.

10. The secure card package of claim 1, wherein the security piece has at least two heights associated therewith.

11. The secure card package of claim 1, wherein the inactive transaction card has an edge associated therewith, wherein the security piece has an edge associated therewith, wherein the inactive transaction card and the security piece are connected at the edges thereof, and wherein the security piece has at least two edges that are perpendicular to and under the edge of the transaction card.

12. A process for activating the inactive transaction card of claim 1, comprising:
    (a) receiving the inactive transaction card and the security piece; and
    (b) detaching the security piece from the inactive transaction card so that activation of the inactive transaction is enabled.

13. The secure card package of claim 4, wherein the inactive transaction card includes first and second edges, and wherein the magnetic stripe extends substantially from the first edge to the second edge.

14. A secure card package, comprising:
   (a) an inactive transaction card, wherein the inactive transaction card includes a magnetic stripe thereon, wherein the magnetic stripe includes data thereon;
   (b) a security piece connected to the inactive transaction card to prevent the data on the magnetic stripe from being read by a card reader located in a retail establishment, wherein the security piece is selectively detachable from the inactive transaction card so that, when detached, the data on the magnetic stripe is accessible by the card reader located in the retail establishment, and wherein the security piece does not include means for activating the inactive transaction card; and
   (c) a card carrier formed from the same piece of material as the inactive transaction card, wherein the card carrier is selectively detachable from the inactive transaction card.

15. The secure card package of claim 14, wherein the card carrier is free from contact with the security piece.

16. The secure card package of claim 14, wherein the card carrier includes an aperture therein for displaying the secure card package from a display device.

17. The secure card package of claim 14, wherein the data on the magnetic stripe has a database record associated therewith, and wherein the security piece prevents the data on the magnetic stripe from being used to access the database record.

18. The secure card package of claim 14, wherein the magnetic stripe is disposed on the inactive transaction card in accordance with ISO and/or ANSI standards.

19. The secure card package of claim 14, wherein the security piece includes information indicating that the transaction card will not be activated if the security piece is detached therefrom.

20. The secure card package of claim 14, wherein the security piece does not include machine readable data.

21. The card package of claim 14, wherein the transaction card has a type associated therewith, and wherein the type is selected from the group consisting of a gift card, loyalty card, credit card, debit card, health card, phone card, prepaid phone card, membership card, identification card, or ringtone card.

22. The secure card package of claim 14, wherein the inactive transaction card has a length associated therewith, wherein the security piece has a length associated therewith, and wherein the length of the security piece is less than the length of the inactive transaction card.

23. The secure card package of claim 14, wherein the security piece has at least two heights associated therewith.

24. The secure card package of claim 14, wherein the inactive transaction card has an edge associated therewith, wherein the security piece has an edge associated therewith, wherein the inactive transaction card and the security piece are connected at the edges thereof, and wherein the security piece has at least two edges that are perpendicular to and under the edge of the transaction card.

25. The secure card package of claim 14, wherein the security piece comprises an adhesive tape.

26. A process for activating the inactive transaction card of claim 14, comprising:
   (a) receiving the inactive transaction card and the security piece; and
   (b) detaching the security piece from the inactive transaction card so that activation of the inactive transaction card is enabled.

27. The secure card package of claim 14, wherein the inactive transaction card includes first and second edges, and wherein the magnetic stripe extends substantially from the first edge to the second edge.

28. A secure card package, comprising:
   (a) an inactive transaction card including an edge;
   (b) a security piece including an edge, wherein the security piece and the inactive transaction card are connected in an edge-to-edge manner to prevent the transaction card from being activated, and wherein die security piece is selectively detachable from the transaction card, wherein detachment of the security piece enables activation of the inactive transaction card, and wherein the security piece does not include means for activating the inactive transaction card; and;
   (c) a card carrier formed from the same piece of material as the inactive transaction card, wherein the card carrier is selectively detachable from the inactive transaction card.

29. The secure card package of claim 28, wherein the security piece is integrally formed with the transaction card.

30. The secure card package of claim 29, wherein the card carrier is free from contact with the security piece.

31. The secure card package of claim 30, wherein the card carrier includes an aperture therein for displaying the card package from a display device.

32. The secure card package of claim 29, wherein the transaction card includes a magnetic stripe thereon, wherein magnetic stripe includes data thereon, wherein the data has a database record associated therewith, and wherein the security piece prevents the data on the magnetic stripe from being used to access the database record.

33. The secure card package of claim 29, wherein the magnetic stripe is disposed on the inactive transaction card in accordance with ISO and/or ANSI standards.

34. The secure card package of claim 29, wherein the security piece includes information indicating that the transaction card will not be activated if the security piece is detached therefrom.

35. The secure card package of claim 29, wherein the security piece does not include machine readable data.

36. The card package of claim 28, wherein the transaction card has a type associated therewith, and wherein the type is selected from the group consisting of a gift card, loyalty card, credit card, debit card, health card, phone card, prepaid phone card, membership card, identification card, or ringtone card.

37. The secure card package of claim 29, wherein the inactive transaction card has a length associated therewith, wherein the security piece has a length associated therewith, and wherein the length of the security piece is less than the length of the inactive transaction card.

38. The secure card package of claim 29, wherein the security piece has at least two heights associated therewith.

39. The secure card package of claim 28, wherein the security piece has at least two edges that are perpendicular to and under the edge of the transaction card.

40. The secure card package of claim 28, wherein the security piece comprises an adhesive tape.

41. A process for activating the inactive transaction card of claim 28, comprising:
   (a) receiving the inactive transaction card and the security piece; and (b) detaching the security piece from the inactive transaction card so that activation of the inactive transaction card is enabled.

42. The secure card package of claim 32, wherein the inactive transaction card includes first and second edges, and wherein the magnetic stripe extends substantially from the first edge to the second edge.

43. A secure card package, comprising:
 (a) an inactive transaction card which includes a first edge and a second edge,
   i. wherein the transaction card includes a magnetic stripe thereon
   ii. wherein the magnetic stripe is at least substantially parallel to the first edge and the second edge of the transaction card, and
   iii. wherein the magnetic stripe is disposed closer to the first edge than to the second edge; and
 (b) a security piece formed from the same piece of material as the transaction card,
   i. wherein the security piece includes a first edge which borders the first edge of the transaction card to prevent the transaction card from becoming active,
   ii. wherein the security piece includes a second edge which is not in contact with first edge of the transaction card, wherein the second edge of the security piece includes at least two heights associated therewith,
   iii. wherein the security piece is selectively detachable from the transaction card at the first edges thereof, and
   iv. wherein detachment of the security piece enables activation of the inactive transaction card.

* * * * *